United States Patent
Hanagan

[11] Patent Number: 5,960,901
[45] Date of Patent: Oct. 5, 1999

[54] BATTERY-POWERED VEHICLE

[75] Inventor: Michael W. Hanagan, Monterey, Calif.

[73] Assignee: Corbin Pacific, Inc., Hollister, Calif.

[21] Appl. No.: 08/923,846

[22] Filed: Sep. 4, 1997

[51] Int. Cl.⁶ .......................... B62D 61/06; B62D 29/00; B60K 1/00
[52] U.S. Cl. .......................... 180/210; 180/60; 180/65.1; 180/298; 280/124.116; 280/124.128; 296/901
[58] Field of Search ..................... 180/210, 65.1, 180/65.5, 65.6, 217, 231, 294, 298, 55, 60, 62; 296/901; 280/124.116, 124.128

[56] References Cited

U.S. PATENT DOCUMENTS

| | | |
|---|---|---|
| D. 262,871 | 2/1982 | Powers . |
| D. 268,402 | 3/1983 | Riley et al. . |
| D. 274,995 | 8/1984 | Richards et al. . |
| D. 283,113 | 3/1986 | Stollery . |
| D. 287,477 | 12/1986 | Takasu . |
| D. 320,958 | 10/1991 | Kimura et al. . |
| D. 329,211 | 9/1992 | Malewicki . |
| 3,117,648 | 1/1964 | Landreth .......................... 280/DIG. 5 |
| 3,294,190 | 12/1966 | Suvor et al. . |
| 3,580,349 | 5/1971 | Brennan .......................... 280/DIG. 5 |
| 3,632,156 | 1/1972 | Schweser ........................ 296/901 |
| 3,964,563 | 6/1976 | Allen . |
| 3,983,952 | 10/1976 | McKee . |
| 4,216,839 | 8/1980 | Gould et al. . |
| 4,313,517 | 2/1982 | Piuar . |
| 4,453,763 | 6/1984 | Richards . |
| 4,484,648 | 11/1984 | Jephcott ........................... 180/210 |
| 4,573,546 | 3/1986 | Irimajiri et al. . |
| 4,648,650 | 3/1987 | Fujii et al. ....................... 296/203 |
| 4,671,563 | 6/1987 | Shakespear . |
| 4,705,716 | 11/1987 | Tang ................................ 296/901 |
| 4,798,255 | 1/1989 | Wu .................................. 280/65.1 |
| 4,917,425 | 4/1990 | Bonnett et al. .................. 296/901 |
| 4,930,591 | 6/1990 | Lanius et al. .................... 280/DIG. 5 |
| 5,150,944 | 9/1992 | Yoshida et al. .................. 296/901 |
| 5,228,742 | 7/1993 | Johnson et al. .................. 296/191 |
| 5,251,721 | 10/1993 | Ortenheim ...................... 180/298 |
| 5,305,845 | 4/1994 | Van Dooren . |
| 5,314,230 | 5/1994 | Hutchison et al. .............. 296/203 |
| 5,343,974 | 9/1994 | Rabek . |
| 5,460,234 | 10/1995 | Matsuura et al. . |
| 5,501,289 | 3/1996 | Nishikawa et al. ............. 180/68.5 |
| 5,660,427 | 8/1997 | Freeman et al. ................ 296/190 |
| 5,688,021 | 11/1997 | Tomforde et al. .............. 296/191 |
| 5,806,622 | 9/1998 | Murphy ........................... 180/210 |

FOREIGN PATENT DOCUMENTS

| | | | |
|---|---|---|---|
| 2684606 | 12/1991 | France . | |
| 5147562 | 6/1993 | Japan . | |
| 5185940 | 7/1993 | Japan . | |
| 264378 | 2/1927 | United Kingdom ............. 180/60 |
| 4140508 | 6/1993 | United Kingdom . | |
| 2265868 | 10/1993 | United Kingdom ............. 180/65.6 |

Primary Examiner—Lanna Mai
Assistant Examiner—Jason S. Brooks
Attorney, Agent, or Firm—Pepe & Hazard LLP

[57] ABSTRACT

A three-wheeled, battery-powered personal vehicle has a single rear wheel at the end of a swing arm pivotally supported on the vehicle chassis. A motor, also pivotally supported on the chassis, pivots about the same axis as the swing arm, pivots and powers the rear wheel through a endless drive member. The chassis is provided by a lightweight, synthetic resin tub with substantial structural rigidity. The upper body is a separate synthetic resin tub which can be nested within the chassis for shipment and readily assembled thereto at the point of sale. The assembled chassis and upper body define a generally ovoidal configuration. Batteries are carried in a front compartment and provide crash protection for frontal impacts and other batteries are located beneath the vehicle seat to provide a low center of gravity. Transversely extending chassis members provide structural stiffness as well as support elements for the assembly.

36 Claims, 16 Drawing Sheets

BATTERY-POWERED VEHICLE

BACKGROUND OF THE INVENTION

The present invention pertains to motor vehicles and, more particularly, to a battery-powered vehicle.

Concerns with environmental protection and with our ever increasing dependence upon foreign petroleum sources have, for many years, generated an interest in battery-powered vehicles. This interest has been especially strong in places such as California where many large cities suffer from air pollution at least in part originating from automobile exhaust. In these same cities, traffic congestion often is caused by large numbers of vehicles, many with only a single occupant, idling in the roadway or circling while seeking a parking place.

The majority of designs for battery-powered automobiles have heretofore involved the provision of electric propulsion system in an otherwise conventional automobile body. Because the size, and hence the weight, of these vehicles placed severe demands upon battery capacity, such vehicles have been forced to adopt exotic, expensive or unproven battery technologies or to accept a severely limited operating range. Neither alternative is commercially acceptable.

Accordingly, it is an object of the present invention to provide a novel lightweight and compact battery-powered vehicle which has a reasonable range between battery charges.

It is also an object to provide such a vehicle which avoids the cost, complexity and technological uncertainty of exotic battery systems and which may also use more exotic battery systems for even longer ranges.

Another object is to provide such a vehicle which is facile to maneuver, can be parked in a small space and occupies a minimum of road space.

Yet another object is to provide such a vehicle which is safe and relatively inexpensive to produce.

SUMMARY OF THE INVENTION

It has now been found that the foregoing and related objects may be readily attained in a battery powered vehicle comprising a chassis having front and rear ends with a rigid swing arm having one end pivotally mounted on the chassis for pivoting about a first horizontal axis. At least one wheel is rotatably supported on the other end of the rigid arm for rotation about a second horizontal axis, and an electric motor is supported on the chassis and has a drive shaft coaxial with the first axis. Power transmission means transmits the power from the motor to the one wheel to effect rotation thereof.

Desirably, the motor is pivotally supported on the chassis, and the motor and the pivot for the arm comprise portions of a member extending transversely of the chassis. The shaft has a drive pulley thereon disposed within a housing comprising a portion of the transversely extending member, and the power transmission means comprises a flexible belt extending about the drive pulley and a pulley drivingly engaged with the one wheel. The housing has at least one aperture through which the belt extends.

The chassis has side walls and there are mounted on the side walls brackets with stub shafts which rotatably support the transversely extending member. A pair of wheels is rotatably supported adjacent the front end of the chassis, and the rigid arm extends rearwardly from its point of pivotal mounting on the chassis. A shock absorber has one end connected to the chassis and its other end connected to the other end of the rigid arm.

In its preferred form, the chassis comprises an ovoidal tub of synthetic resin having a bottom wall, front and rear walls, side walls, and forward and rearward transversely extending bulkheads spaced from the front and rear walls. The tub is formed as a monolithic structure.

The chassis also includes front and rear wheel mount assemblies each comprising metal mounting members at least partially embedded within the side walls of the tub and a plurality of transversely extending metal rods connecting the mounting members and rigidifying the chassis. The rigid arm is pivotably supported on the rear wheel mount assembly.

Electric storage batteries are disposed in a compartment between the front wall and the forward bulkhead and in a compartment between the rearward bulkhead and the rear wall. A driver's seat is removably supported on the rearward bulkhead and rear wall and extends over the rear compartment.

Generally, the vehicle will include an upper tub of synthetic resin extending over the chassis and defining therebetween a passenger compartment. The chassis and upper tub together define a generally ovoidal configuration. Both the chassis and upper tub are formed from fiber-reinforced synthetic resin and are comprised of inner and outer skins and a synthetic resin foam between the skins. The upper tub and chassis have overlapping portions, and fasteners secure the overlapping portions in assembly. The overlapping portions may also be adhesively bonded.

In addition to the lower tubs providing the chassis and the upper tub, the vehicle has molded front and rear sections which are assembled with and secured to said chassis and upper tub.

DETAILED DESCRIPTION OF THE PREFERRED EMBODIMENTS

The present invention derives from the dual recognition that weight minimization is critical to the design of a commercially successful battery-powered vehicle and that the greatest portion of automobile usage occurs with only a single occupant.

By designing a vehicle specifically for individual use, a significant size reduction has been achieved as compared with conventional automobile configurations. This reduction in vehicle size reduces the structural demands on the vehicle chassis, allowing the use of lightweight materials in place of the conventional steel beams. The size reduction, coupled with the material substitution, results in a very significant reduction in vehicle weight. Vehicle weight is further reduced by integrating the chassis with the lower portion of the body and by utilizing metallic members to stiffen the integrated structure. The weight reduction, in turn, reduces power consumption to the point that conventional lead/acid batteries are able to provide the vehicle with a commercially acceptable range between battery charges. In practice, a vehicle weight of approximately 900 pounds with a range of 60 miles between charges has been achieved.

Figure 1:
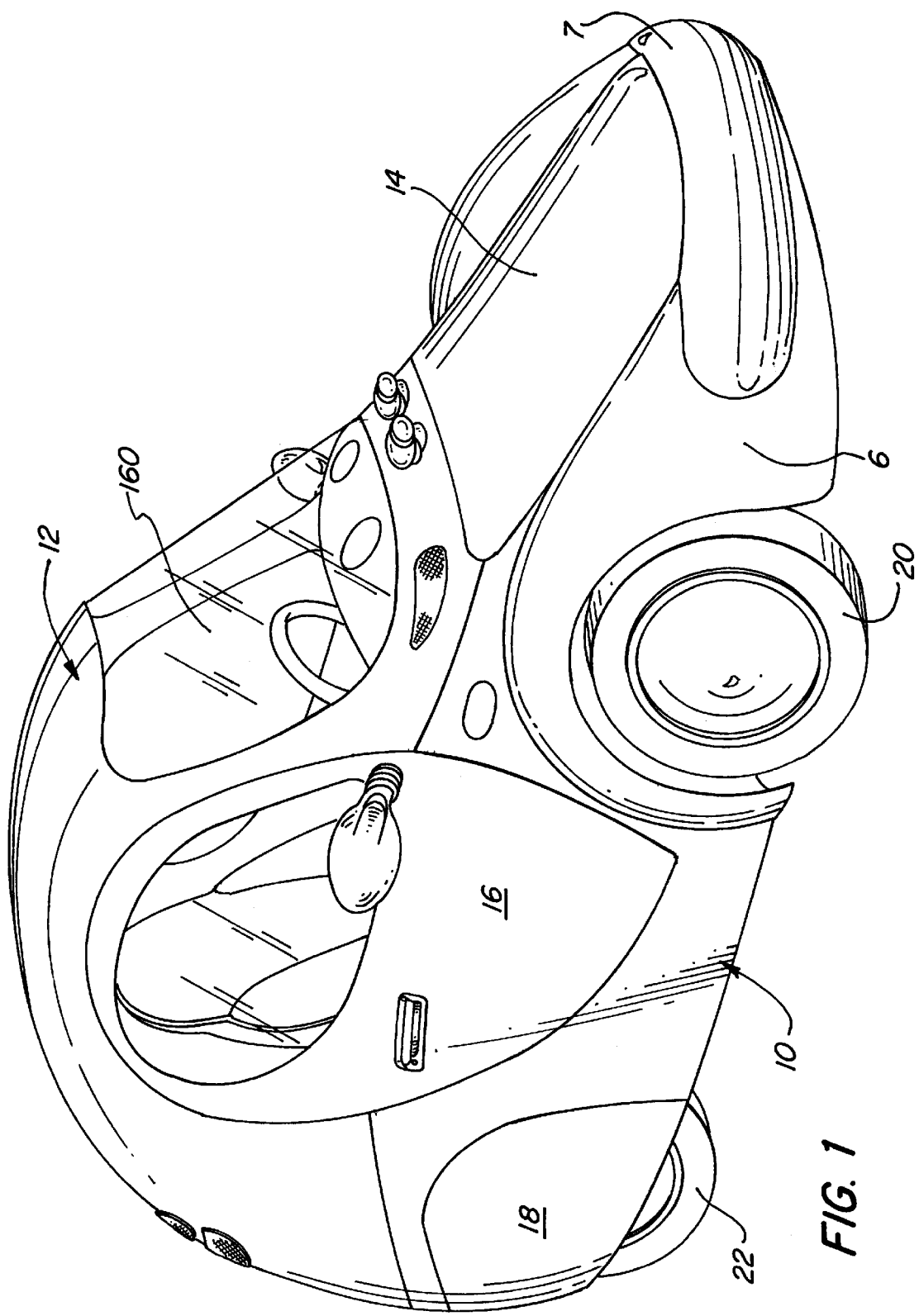
FIG. 1 is a front perspective view of a vehicle embodying the present invention.
Figure 2:
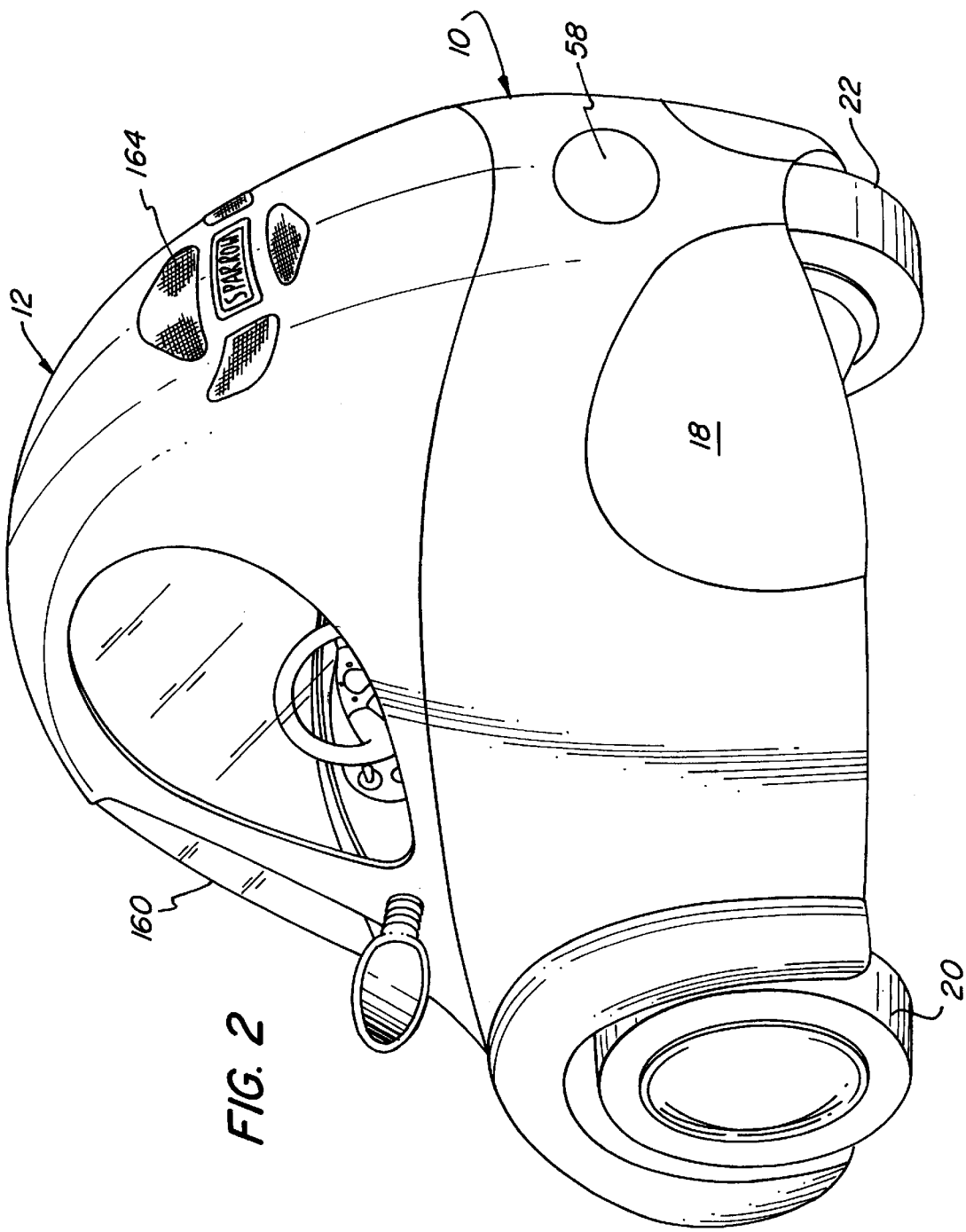
FIG. 2 is a rear perspective view of the vehicle of FIG. 1.

Turning first to FIGS. 1 and 2 of the attached drawings, therein illustrated is a three-wheeled, battery-powered personal vehicle embodying the present invention. It has a molded chassis and lower body generally designated by the numeral 10, a molded upper body generally designated by the numeral 12, a hood 14, a pivotably mounted door 16 and rear skirts 18. The vehicle has a pair of front wheels 20 and a single rear wheel 22.

Figure 3:
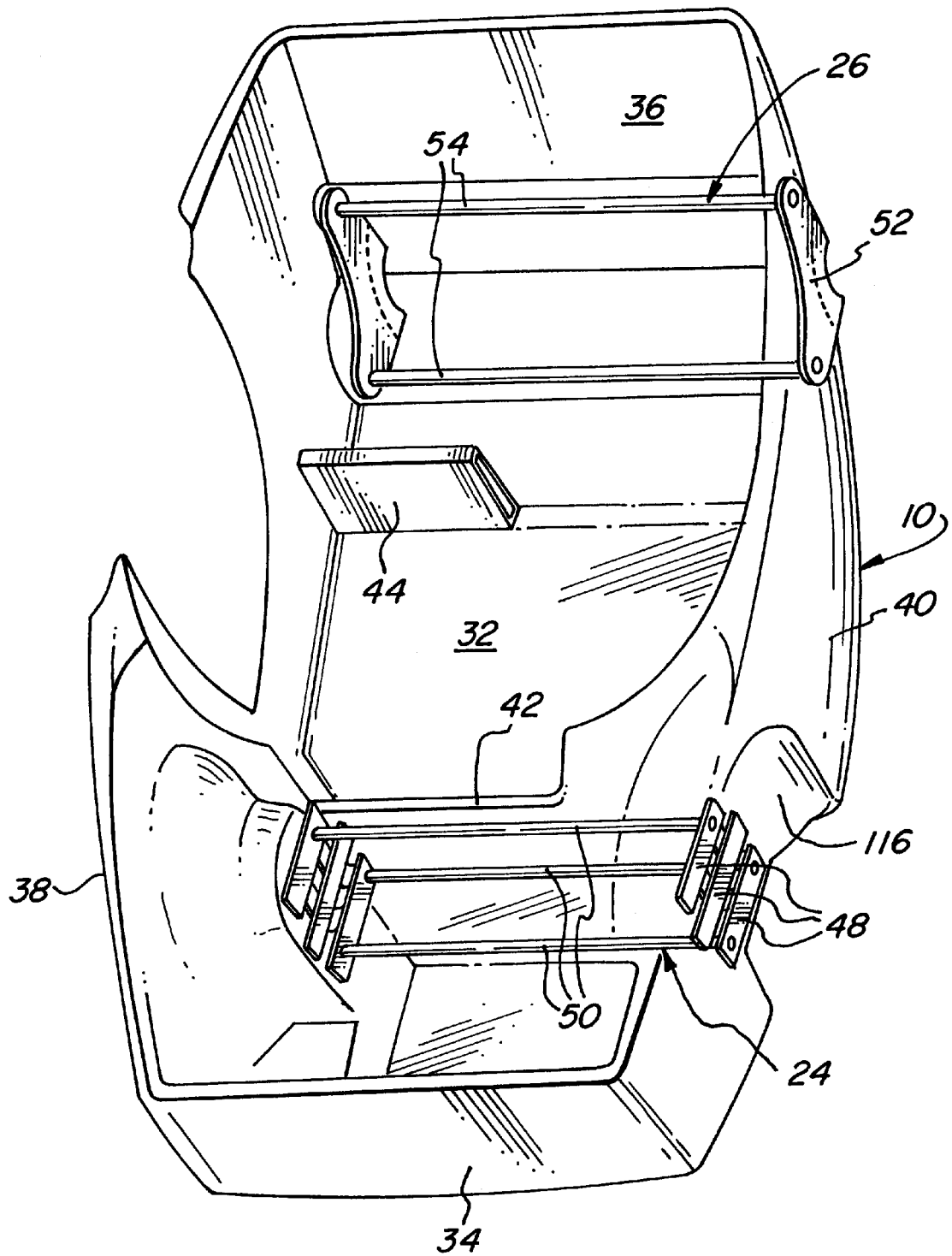
FIG. 3 is an isometric view, partly broken away, of the chassis of the vehicle of FIG. 1 with a portion of the rear bulkhead broken away and illustrating the reinforcing assemblies.
Figure 5:
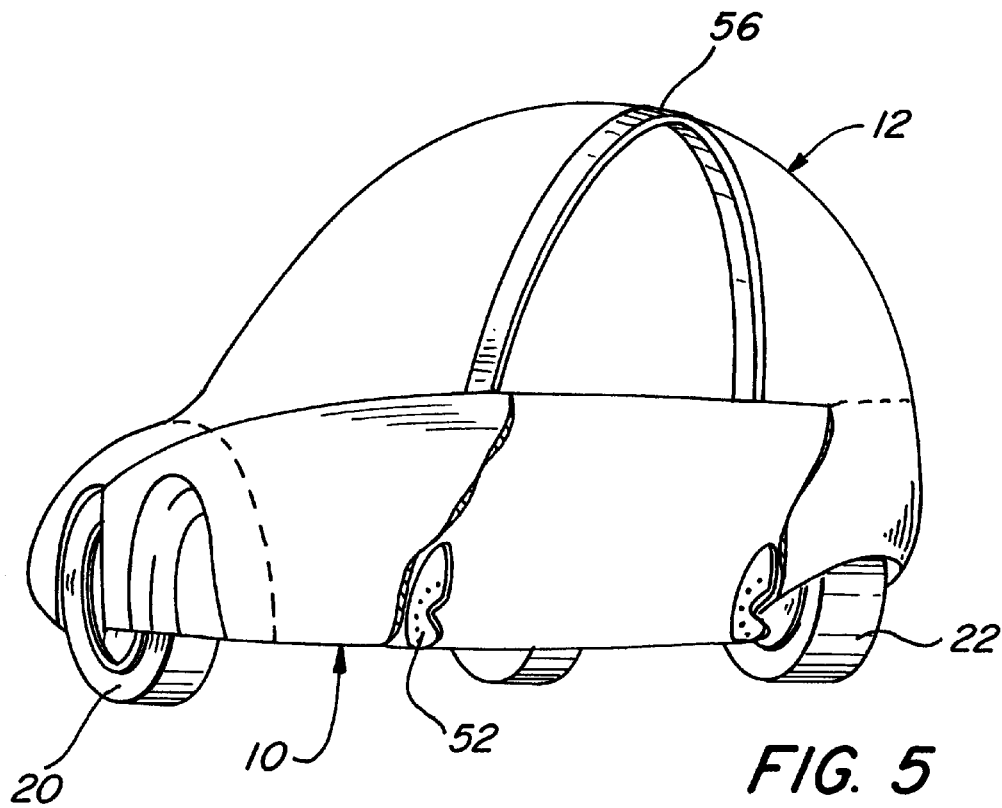
FIG. 5 is a partially diagrammatic perspective view with portions broken away and showing the reinforcing rib in the upper body.
Figure 4:
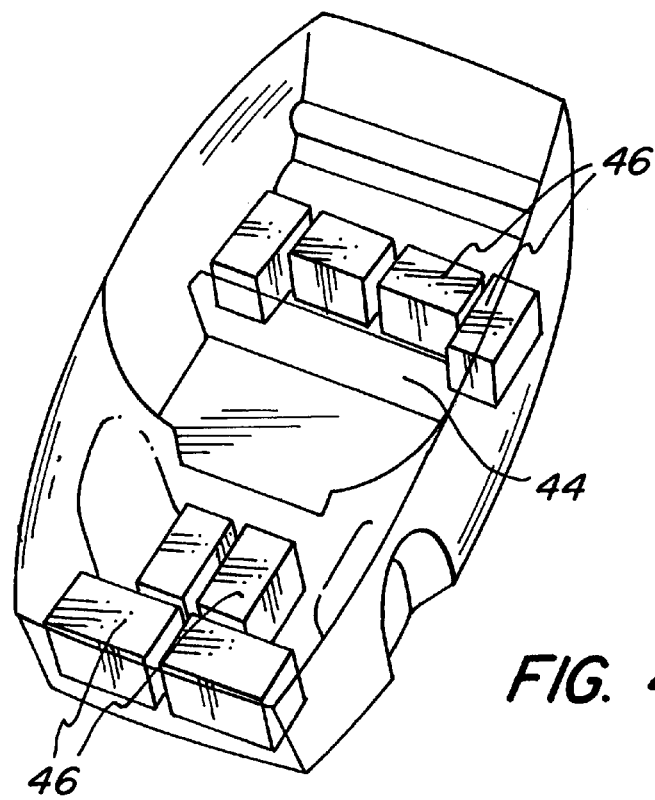
FIG. 4 is a simplified isometric view, similar to FIG. 3, showing the placement of batteries therein.
Figure 17:
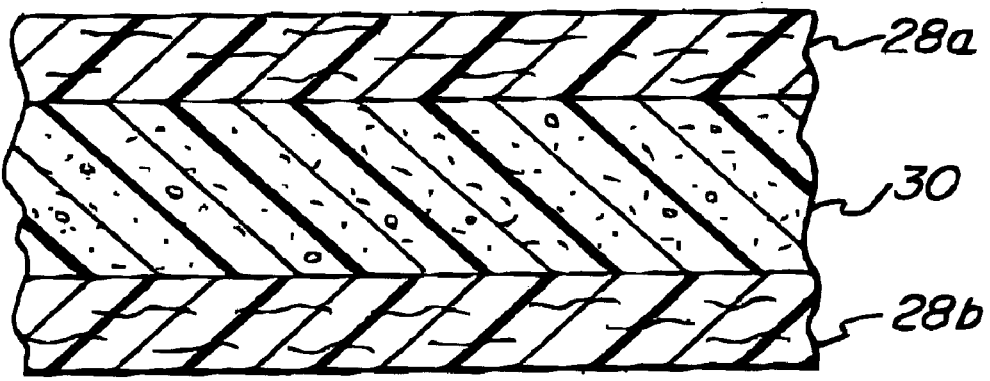
FIG. 17 is a fragmentary sectional view of the wall of a tub.

As best seen in FIGS. 3–5, the chassis and lower body 10 of the vehicle have been combined in a single member which is provided by a monolithic, open topped, hollow walled fiber-reinforced synthetic resin tub, which incorporates a front wheel mount assembly generally designated by the numeral 24 and a rear wheel mount assembly 26. As seen in FIG. 17, the tub 10 is formed of a pair of fiber-reinforced synthetic resin skins 28a,b with an intermediate synthetic resin foam core 30. The chassis and lower body 10 has a bottom wall 32, front and rear walls 34 and 36, left and right side walls 38 and 40, and forward and rearward transverse bulkheads 42 and 44.

As illustrated in FIG. 4, the forward and rearward bulkheads 42 and 44 cooperate with the front and rear walls 34, 36 respectively to provide compartments in which are seated the batteries 46 which also providing structural stiffness to the chassis 10. The batteries 46 are divided into two approximately equal groups 46a and 46b. The forward group 46a are disposed between the front wall 34 and the forward bulkhead 42, where they also serve to provide additional crash protection to the vehicle occupant from a front impact. The rearward group 46b are disposed between the rearward bulkhead 44 and the rear wall 36. The rearward bulkhead 44 also provides the front support for the vehicle seat shown in FIG. 12 which extends over the rearward compartment and the rearward group of batteries 46b. Both groups of batteries are placed as low as possible in the chassis 10 to keep a low center of gravity and also provide side impact protection. As can be seen, the batteries 46 are symmetrically disposed about the centerline and are low in the chassis 10 to provide a low and well located center of gravity for the vehicle and to balance substantially the load on the front wheels 20 and rear wheel 22.

The front wheel mount assembly 24 comprises three pairs of metal plates 48 embedded within the side walls 38, 40 of the chassis 10, and the upper and lower plates are connected by transversely extending metal rods 50 between them which are embedded in the bulkhead 42 to increase their rigidity.

The rear wheel mount assembly 26 comprises a pair of generally arcuate metal mounting plates 52 which are partially embedded within the side walls 38, 40 and connected by a pair of transversely extending metal rods 54 which are embedded in the rear wall 36. As previously described, the rear wheel mount assembly 26 increases the transverse strength of the chassis 10 as well as provides the means for supporting the rear wheel assembly.

The vehicle upper body 12 is separately formed and may be nested in the chassis 10 for shipment and readily assembled at the point of sale. As seen in FIG. 5, the upper body 12 includes an integrally formed, transversely extending thickened rib 56 which acts as a roll bar. The bottom of the upper body 12 has a peripheral portion which overlaps the upper end of the chassis 10, and fasteners (not shown) extend through the overlapping portions to secure the upper body 12 to the chassis 10.

In order to maximize the chassis strength and to simplify construction, only a single door 16 is provided. The door 16 is on the right side of the vehicle to maintain maximum impact resistance on the left side of the vehicle because statistics show that the majority of collisions involve impact on the left side of a vehicle. In addition, the right side location is on the sidewalk side in right-hand drive countries. In left-hand drive countries, the location of the door will be on the left side for the same reasons. Moreover, having only one door reduces weight and cost and increases the strength of the generally spheroidal configuration and improves the aerodynamics.

Figure 10:
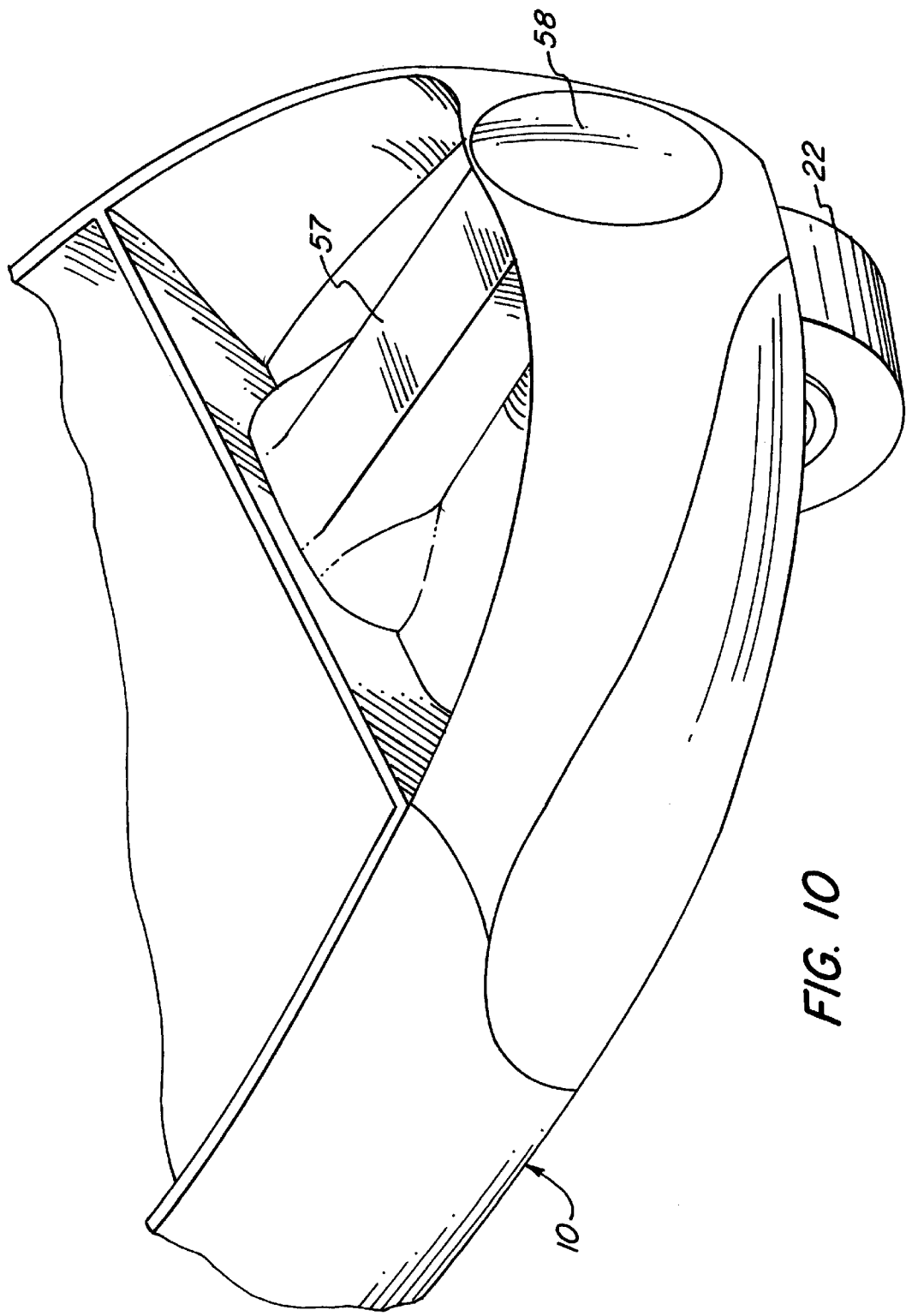
FIG. 10 is a fragmentary perspective view of the rear end of the vehicle with the top body removed.

As seen in FIG. 10, the rear end of the chassis has a longitudinally extending tunnel portion 57 in which is contained a spring (not shown) which cooperates with the bumper 58 to absorb impacts on the rear of the chassis 10. The rear skirts 18 may be removed from the chassis 10 to enable easy access to the rear wheel 22, and they also to streamline the air flow and appearance.

Figure 12:
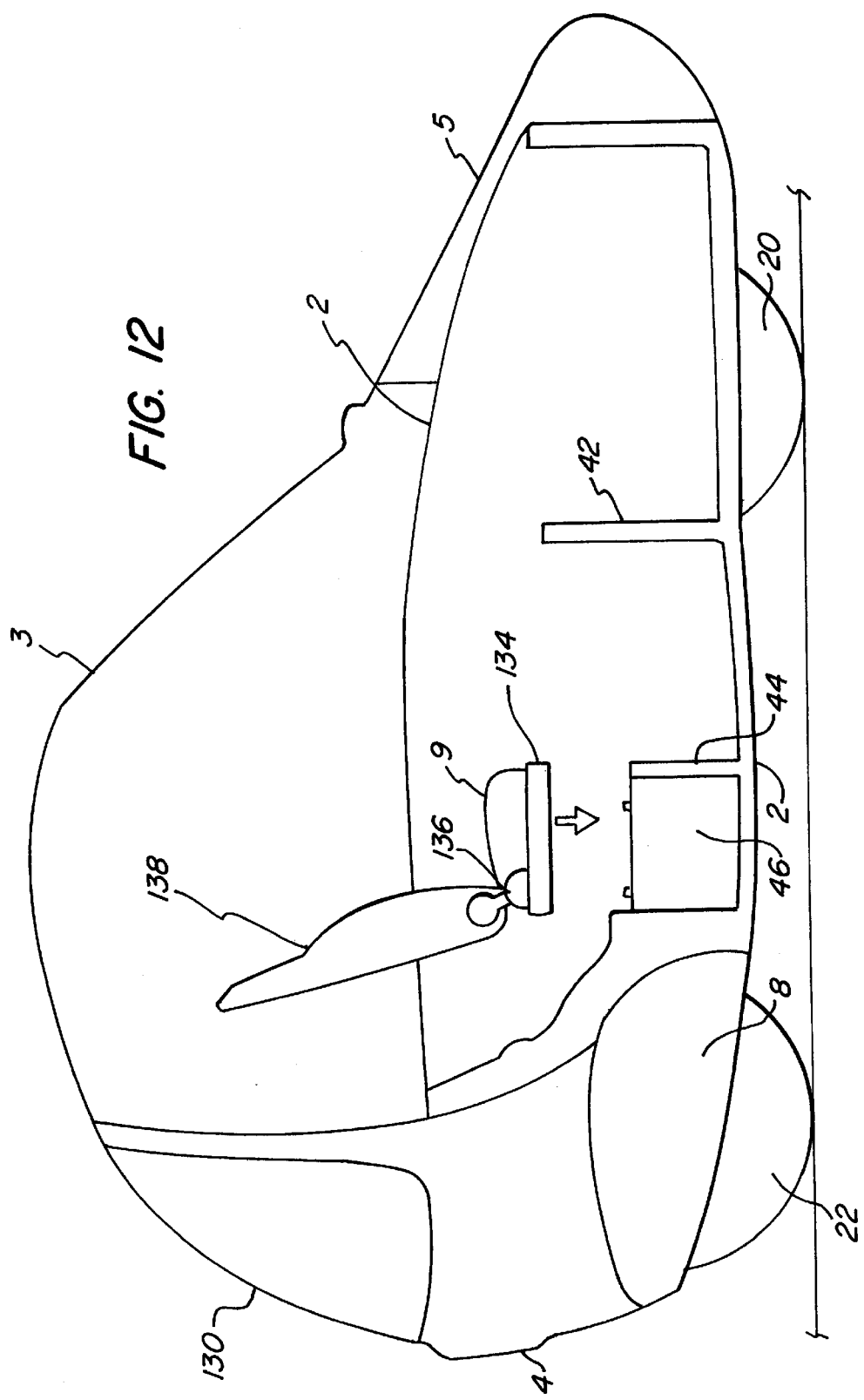
FIG. 12 is a partially diagrammatic view showing the manner in which the rear section is bolted to the upper and lower tubs.

FIG. 12 illustrates the several molded sections which are assembled to provide the chassis and body. The ovoidal lower tub 2 provides the bulk of the chassis and lower body 10, and it has a generally arcuate contour for its side walls and rear wall. It mounts all of the principal mechanical and electrical components.

The upper tub 3 is also arcuate in contour and cooperates with the lower tub 2 to provide a generally ovoidal structure for containment of the driver. It has the reinforcing rib 56 at its rearward end.

The rear section 4 provides the rear end portion of the vehicle and includes the rear bumper assembly 58 and provides a hatch 130 for access to the interior of the vehicle.

Its upper portion is arcuate, and it is designed to absorb impact energy in a crash to protect the driver.

The front section 5 provides the front fenders 6 and the front bumper assembly 7, and it mounts the hood 14. It is designed to deform upon impact so as to absorb the energy in a frontal impact.

The valance panels 18 provide skirts to cover the rear wheels 22 and drive train and are easily removed for servicing thereof.

Figure 13:
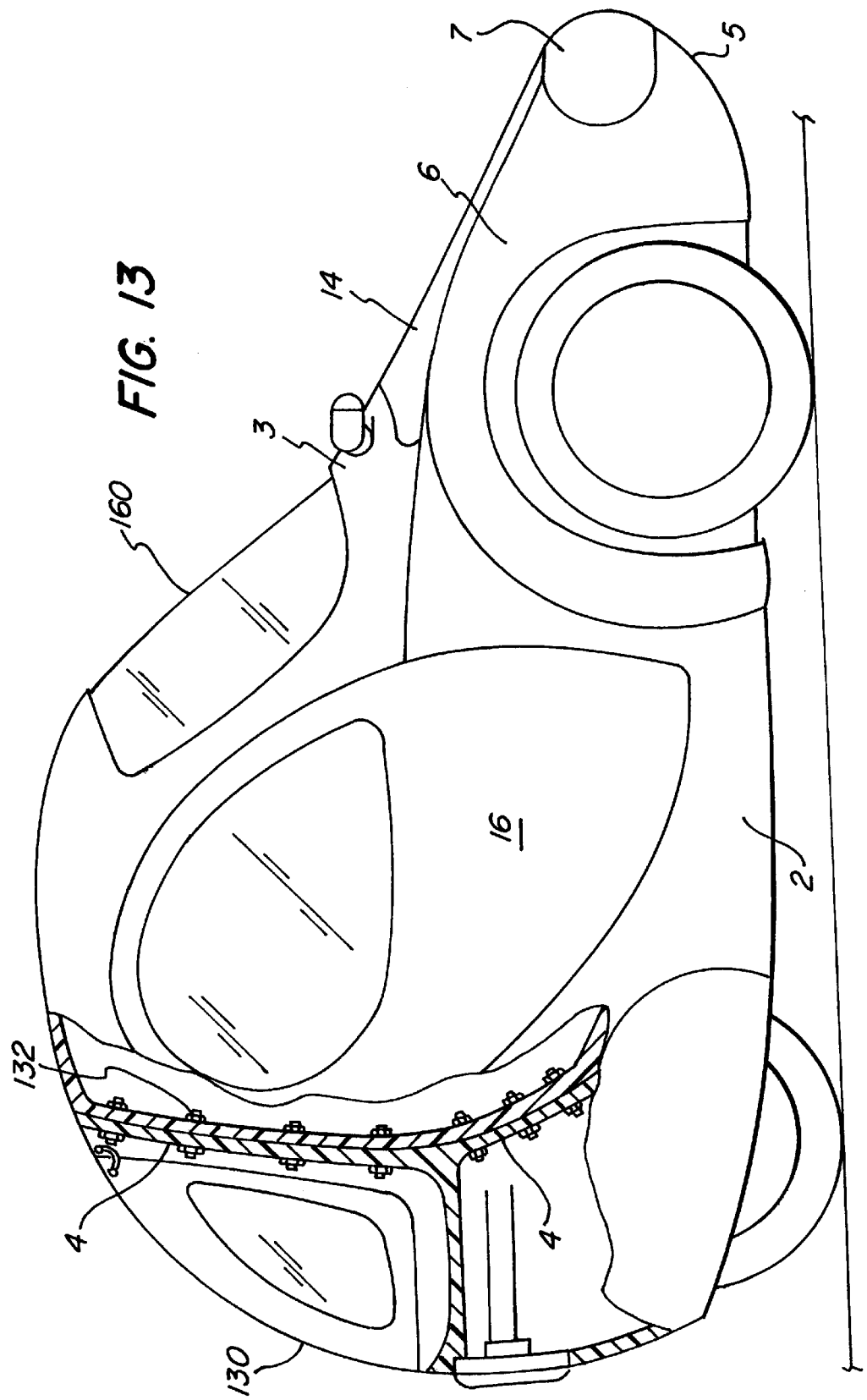
FIG. 13 is a partially diagrammatic side elevational view of the vehicle with portions broken away to illustrate the separately molded components of the vehicle body and chassis.

The several sections 2-5 are secured in assembly by bolts 132, as illustrated in FIG. 13 for the joint between the rear section 4 and lower and upper tubs 2 and 3. As shown, the seat generally designated by the numeral 9 is a integrated structure which is mounted over the rearward compartment or battery box by four bolts (not shown). An elastomeric seal (not shown) extends about the upper edge of the battery box to provide a seal when the seat 9 is placed thereon. The seat 9 has a bottom member which mounts the hardware 136 for adjustment of the seat back 138.

Figure 6:
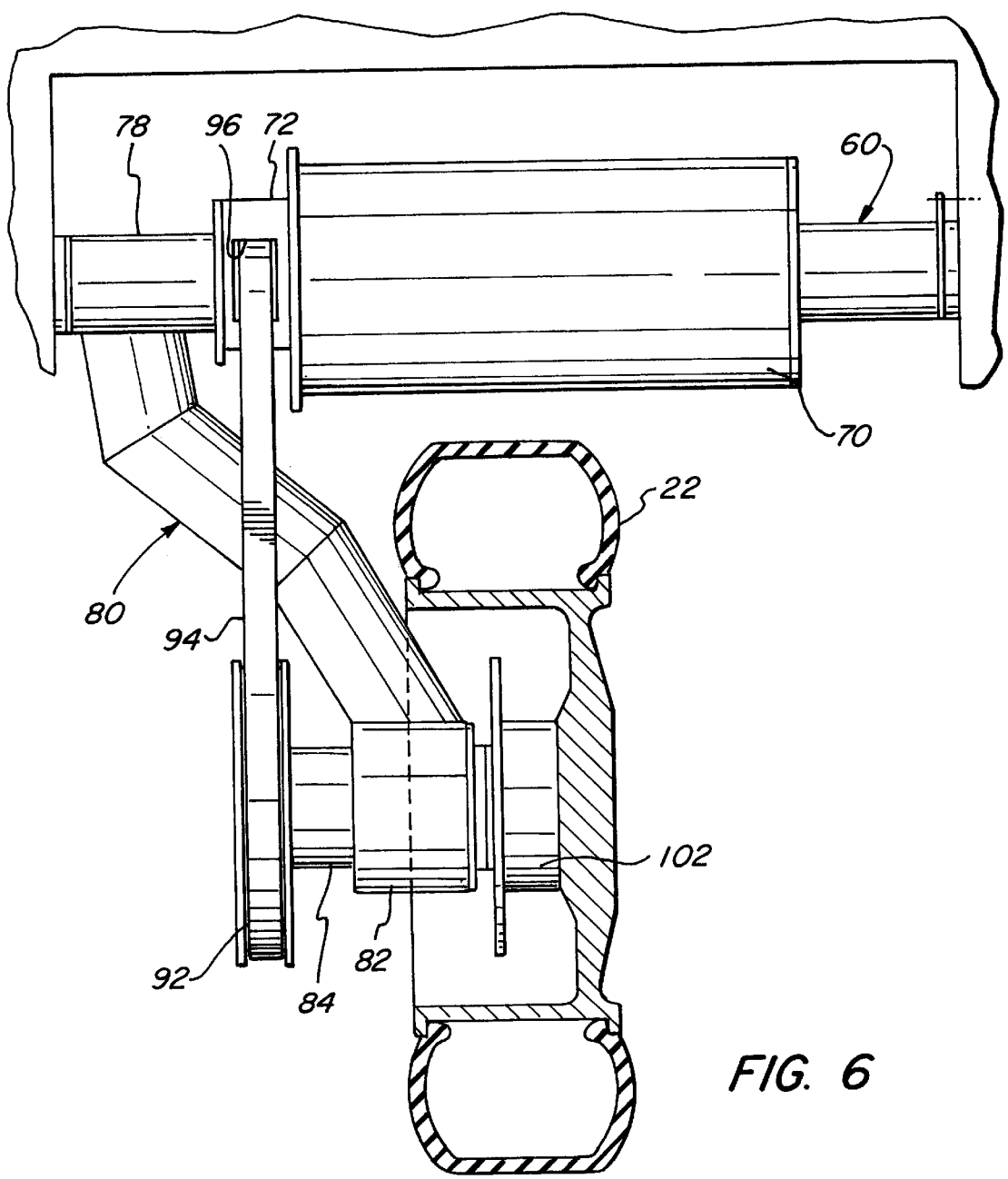
FIG. 6 is a top view of the motor and swing arm assembly.
Figure 7:
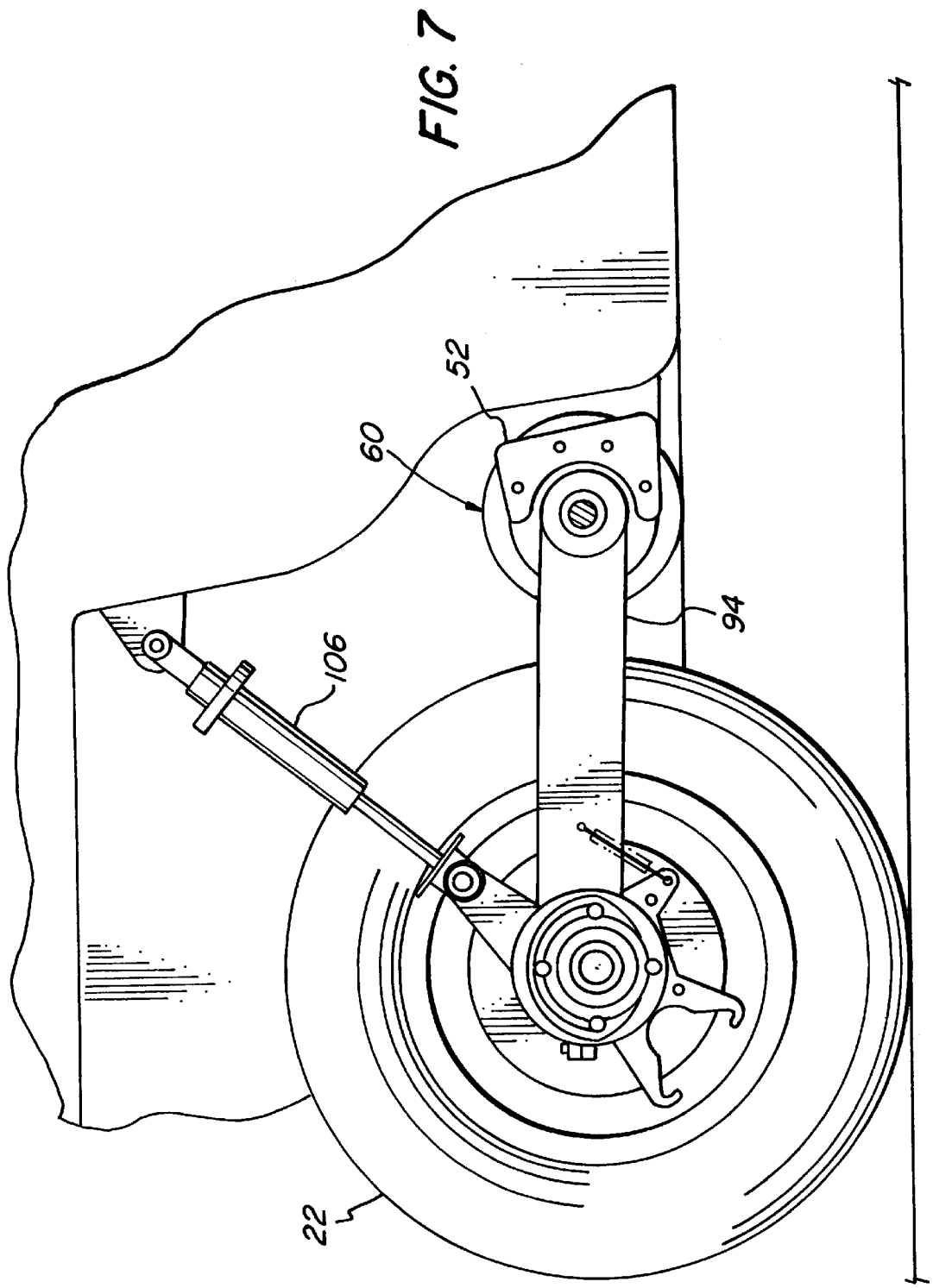
FIG. 7 is a side elevational view of the motor and swing arm assembly of FIG. 6.
Figure 8:
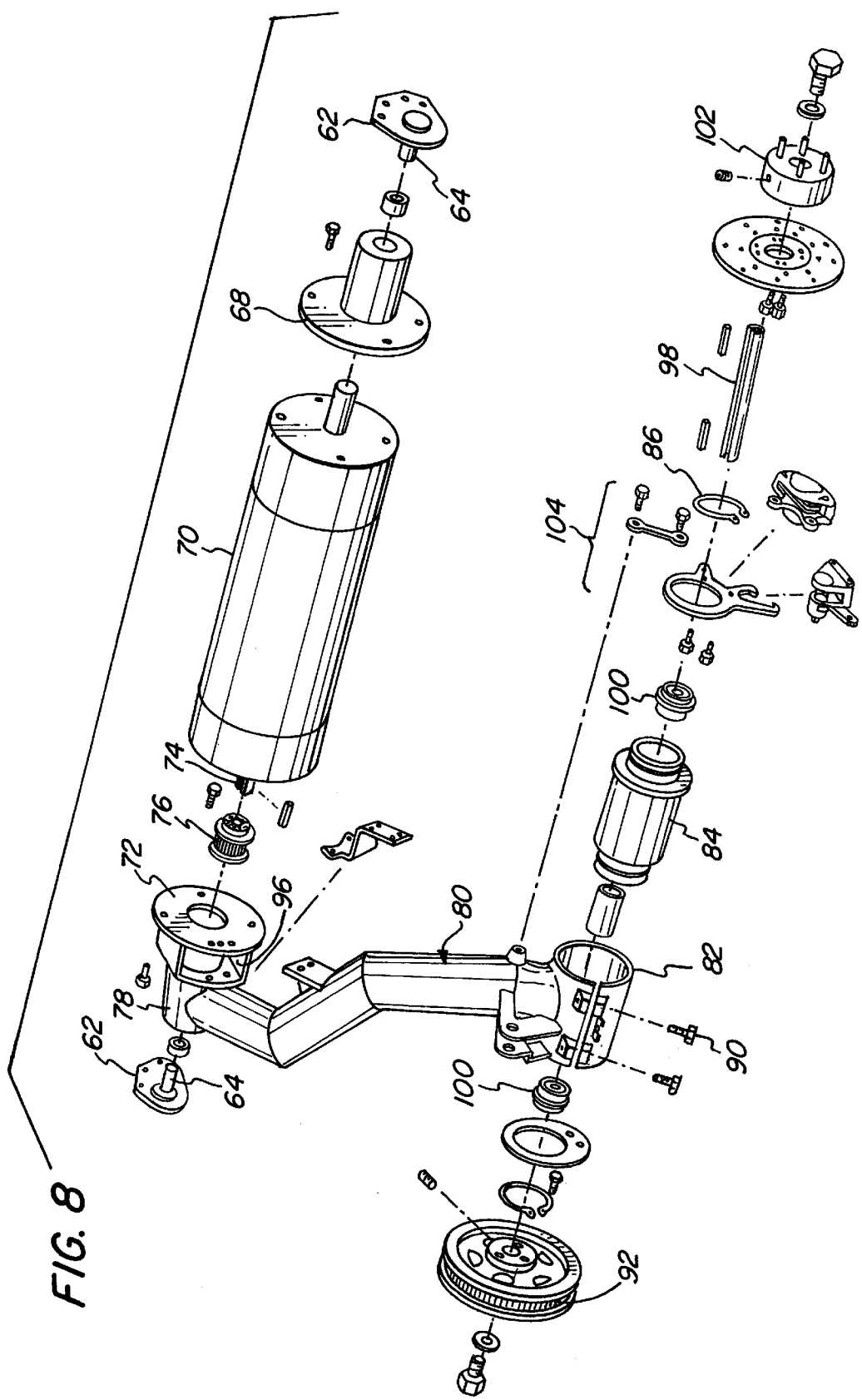
FIG. 8 is an exploded view of the swing arm and motor assembly exclusive of the tire and its wheel.

As best seen in FIGS. 6–8, the rear wheel assembly includes a transversely extending axle member generally designated by the numeral 60 which is supported on the metal plates 52 by the brackets 62 which have stub shafts 64 thereon. As seen in FIG. 8, the stub shaft 64a rotatably seats in the hub 66 of the motor mount 68 which in turn is bolted to the motor 70. At its opposite end the motor 70 has a housing 72 bolted thereto and its drive shaft 74 extends thereinto and has a pulley 76 mounted thereon. Bolted to the other end of the housing 72 is the hub 78 of the swing arm generally designated by the numeral 80, and the stub shaft 64b seats therein. Thus, the fixed stub shafts 64 rotatably support the axle member 60 generated by the several assembled components.

At the other end of the swing arm 80 is a generally cylindrical wheel mounting portion 82 in which is seated the eccentric 84 for the rear wheel 22. The eccentic 84 is held in place by the retaining rings 86, positioning plate 88 and pinch bolts 90. Carried by the eccentric 84 is the pulley 92, and the drive belt 94 extends thereabout, through the aperture 96 in the housing 72, and about the pulley 76 therein.

The rear axle 98 is seated in the bearings 100 and supports the rear wheel hub 102. Also shown in FIG. 8 are the elements of the brake assembly generally designated by the numeral 104.

By disposing the motor 70 within the axle member 60, a constant distance is maintained between the driven pulley 92 and the motor output drive pulley 76, and the eccentric 84 allows adjustment of the tension in the belt 94, allows gearing changes and ease of belt installation. Thus, a constant tension is maintained on the drive belt 94 without the need for complex tensioning devices which increase drag. The motor mount location further serves to keep the vehicle's center of gravity low and avoids the vibration or oscillation which would be otherwise induced by the rotation of the motor mass about the axle member 60. A shock absorber 106 is connected between the distal end of the swing arm 80 and a bracket 108 on the chassis 10.

Figure 9:
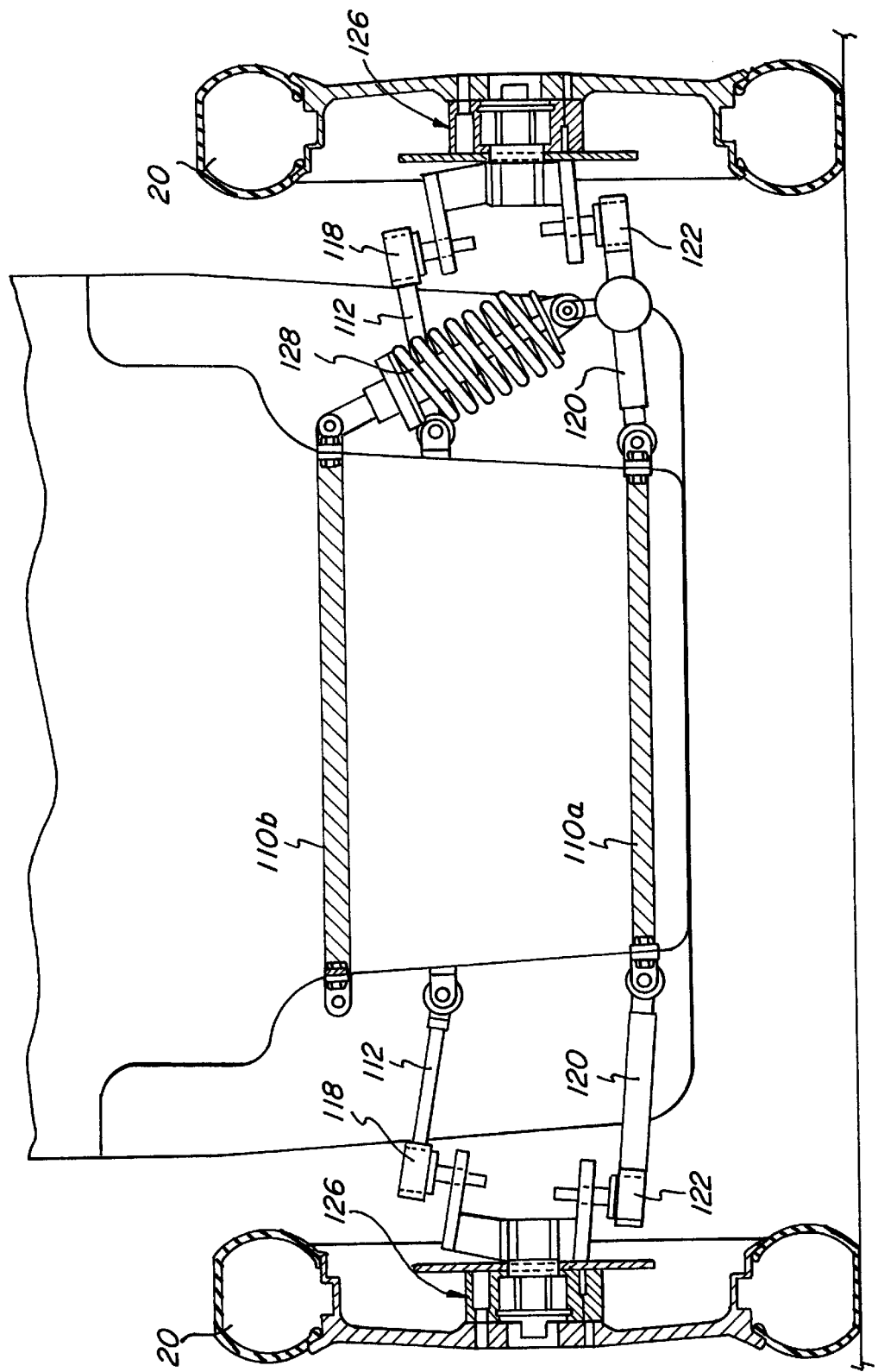
FIG. 9 is a partially diagrammatic, transverse sectional view showing the front wheel assembly and embedded cross members.

Turning next to FIG. 9, therein illustrated is the front wheel assembly. The metal bars 110 are embedded in the forward bulkhead 42 which has been omitted for clarity, and they serve to strengthen the assembly as well as to mount other components. The A-arms 112 are seated in the ball joints 118. The control arms 120 are seated at one end in brackets at the ends of the lower bars 110a and at the other end in the lower ball joints 122.

The ball joints 118, 122 are supported in the uprights 124 which are connected to the hubs 126 upon which are mounted the front wheels 20. Shock absorbers 128 (only one of which is shown) are connected between the ends of the upper bars 110b and the control arms 120.

Figure 11:
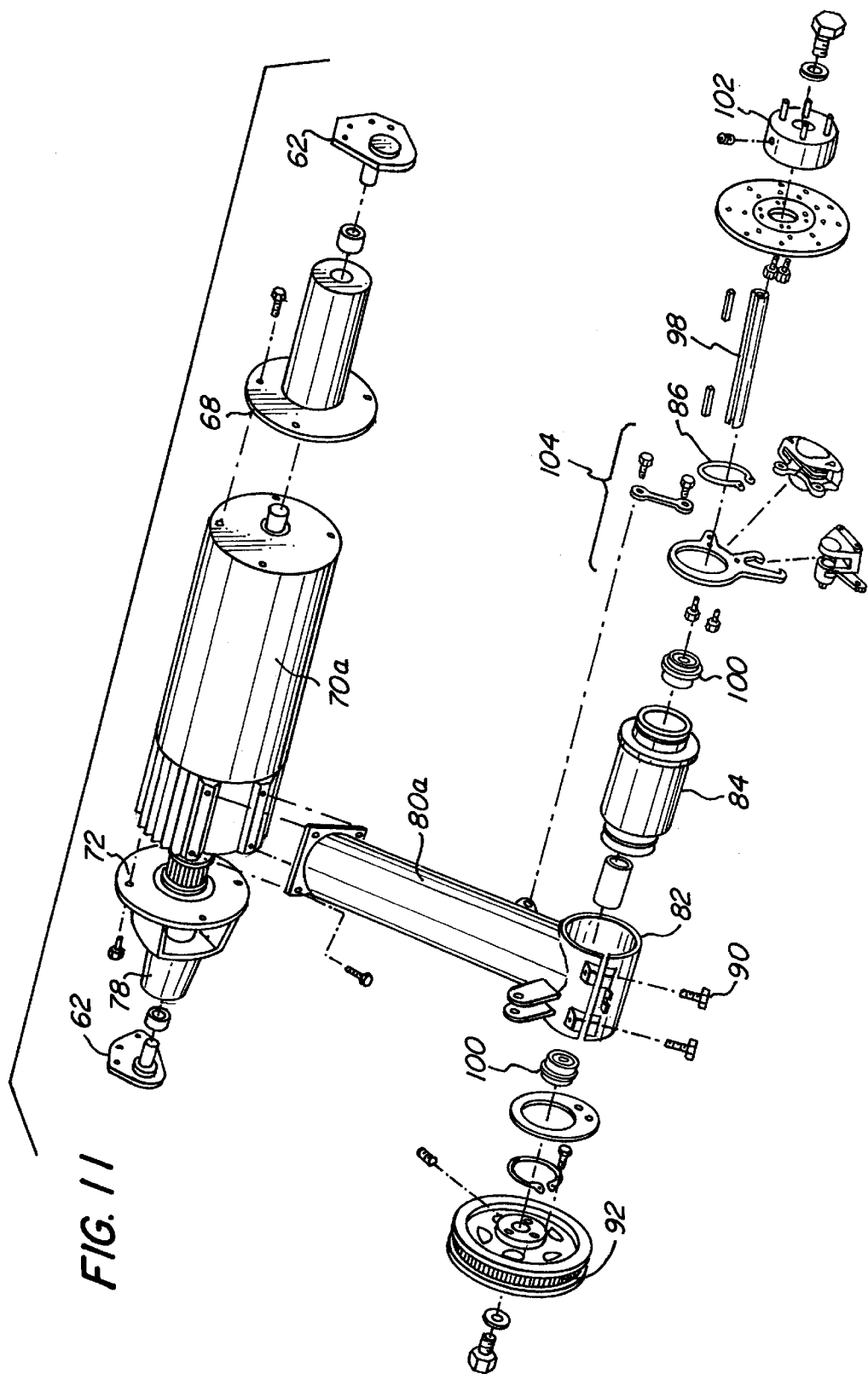
FIG. 11 is an exploded view of another embodiment of swing arm assembly.

Turning next to FIG. 11, therein illustrated is an alternate embodiment of the swing arm assembly in which the swing arm 80a is itself directly bolted upon the housing of the motor 70a with an integrated planetary gearbox.

Figure 14:
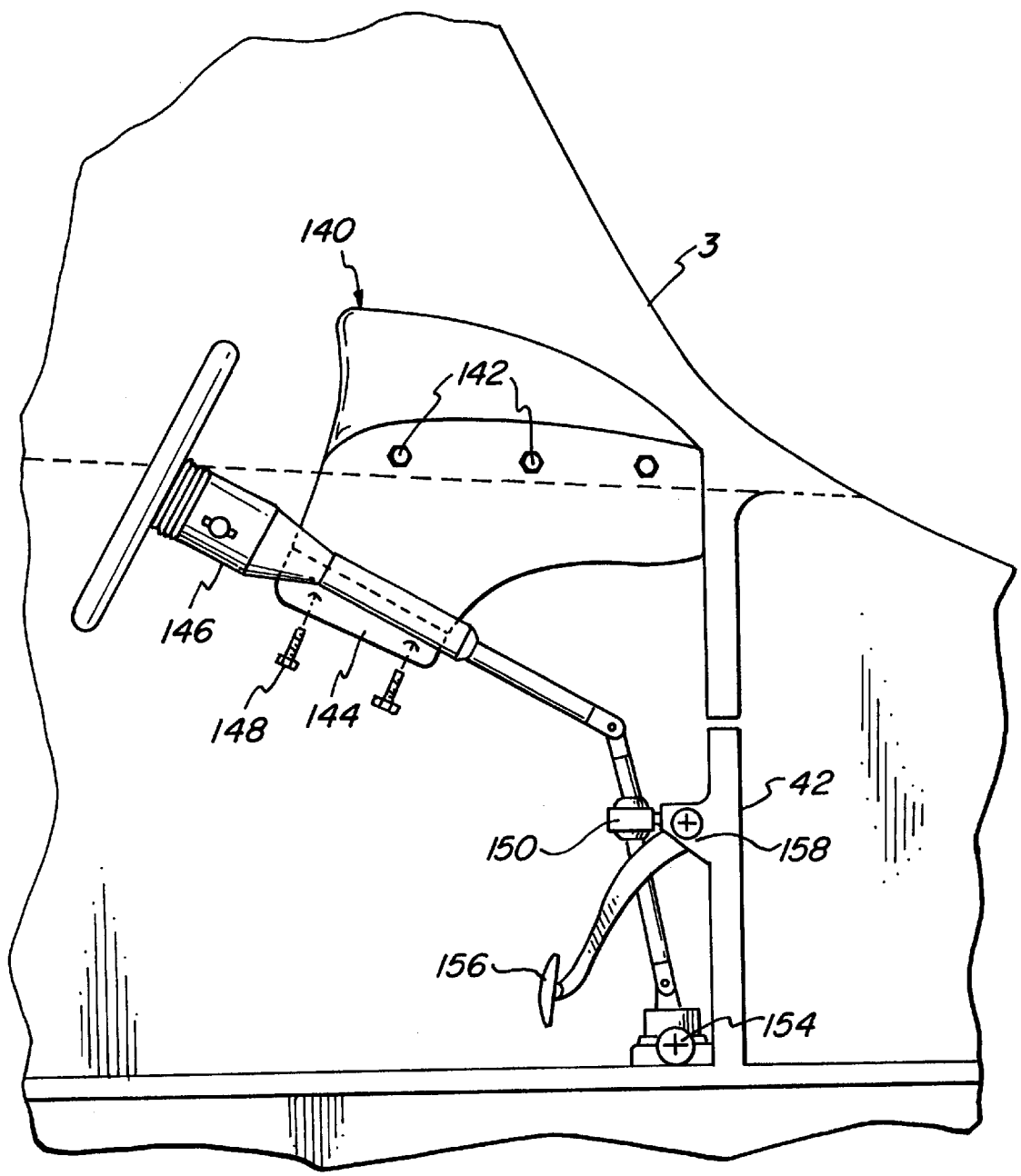
FIG. 14 is a partially diagrammatic view showing the dashboard, steering assembly and brake pedal as mounted in the fragmentarily illustrated body.

FIG. 14 illustrates the molded dashboard housing 140 which is secured to the upper tub 3 by bolts 142. Its lower end is formed as a split collar 144 which is clamped about the steering column 146 firmly by the bolts 148. The steering column 146 has a rod 150 which threads into the bracket 152 on the forward bulkhead 42 and connects to the steering rack 154 to which the tie rods (not shown) are attached. The brake pedal 156 is mounted on the bracket 158 on the bulkhead 42. The dashboard housing 140 serves not only as the mounting for various indicators but also as the support for the steering column 146 and a transverse reinforcing component. Thus, it reduces weight and the number of parts for the assembly.

Figure 15:
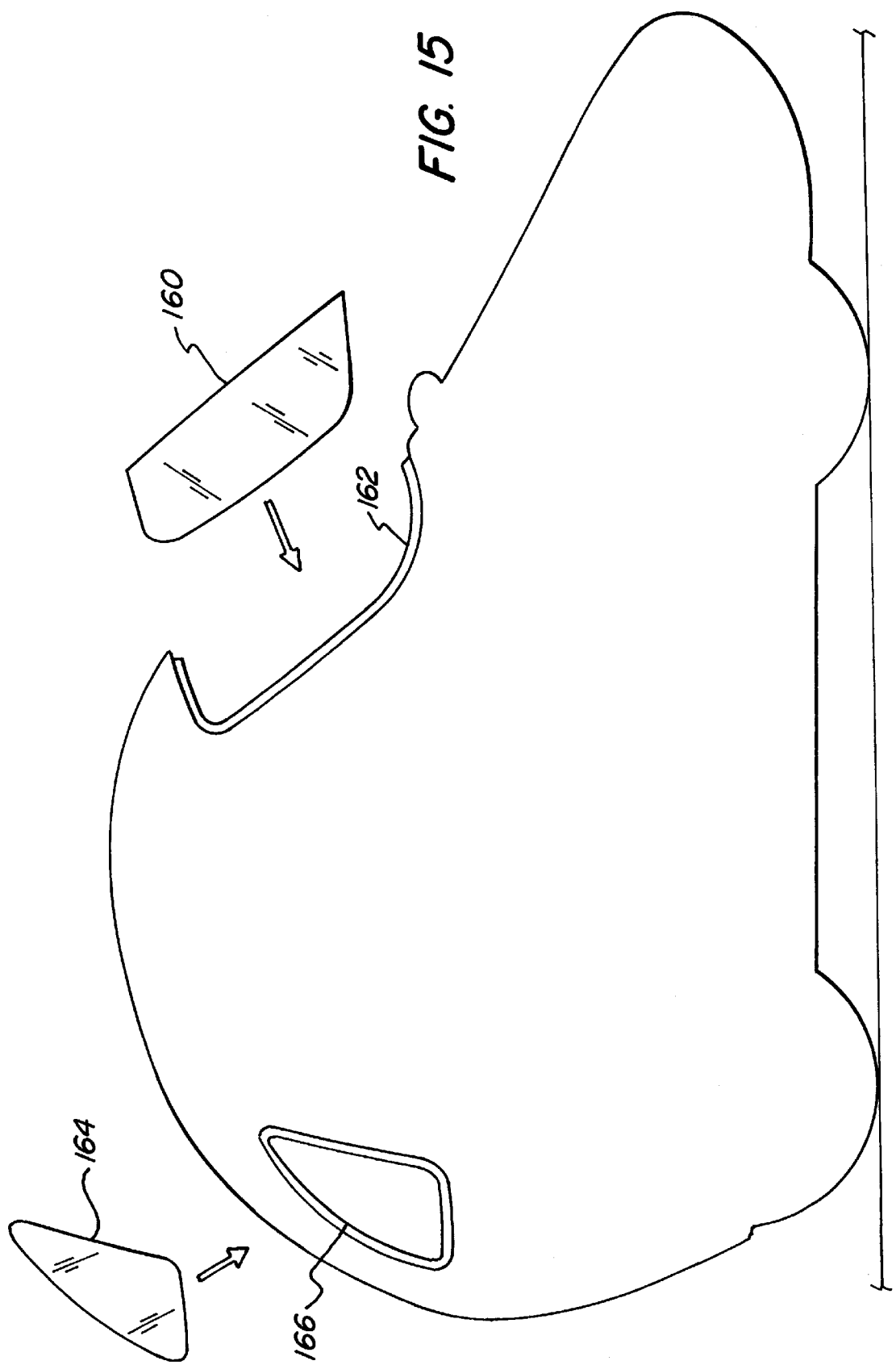
FIG. 15 is a partially diagrammatic view showing the windshield dissembled from its recess and one of the rear windows disassembled from its recess.

FIG. 15 shows the front windshield 160 about to be seated against the recessed shoulder 162 extending about the opening in the upper tub 3. It is secured onto the shoulder 162 by urethane adhesive. One of the two rear windows 164 is shown removed from the shoulder 166 about the opening in the rear sections 4, and it is similarly secured.

Although the shoulders 162 will resist its inward movement, the windshield 160 can be pushed outwardly in the event that the driver is trapped in the vehicle.

Figure 16:
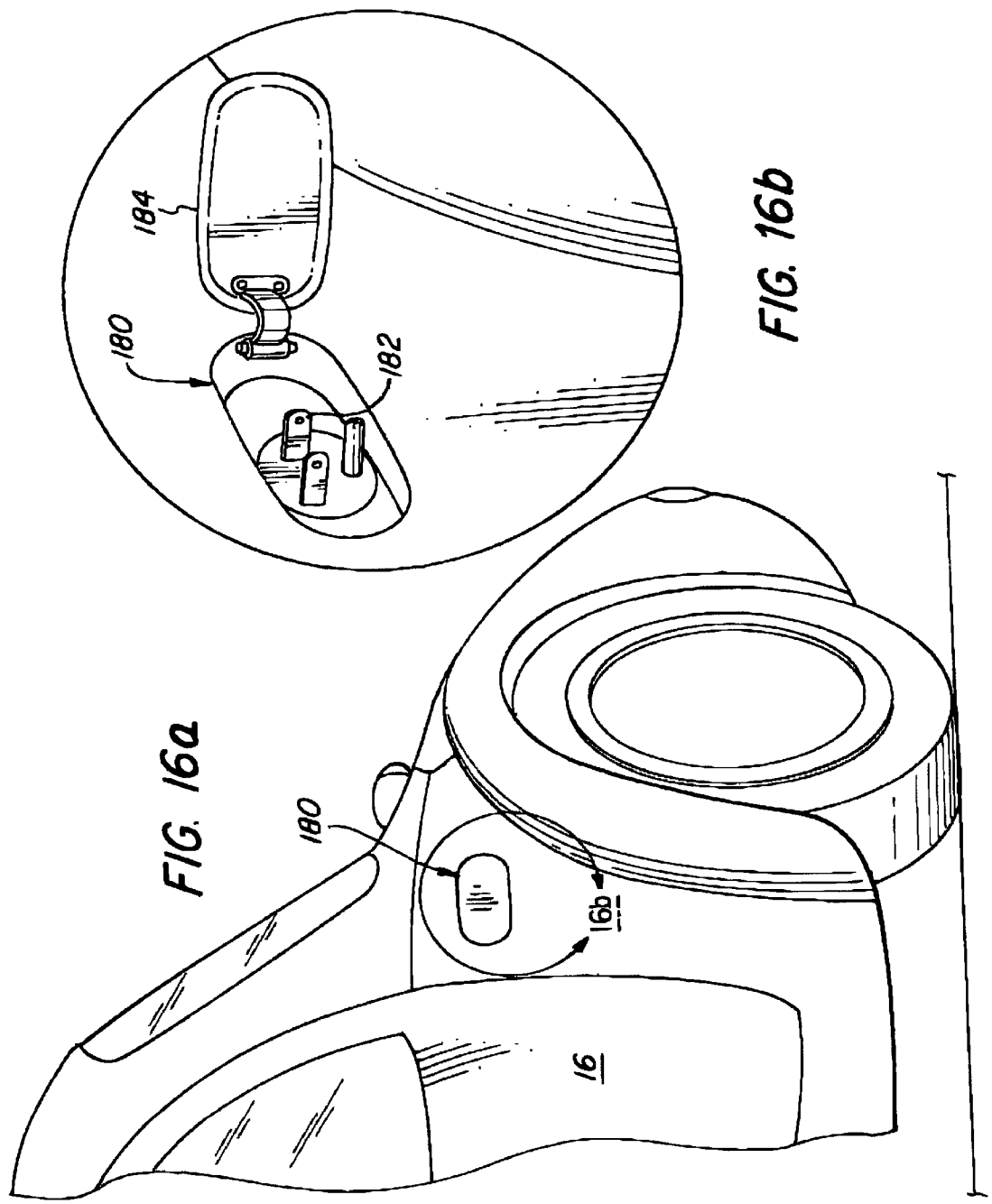
FIG. 16a is a fragmentary view of the vehicle showing the charging port for the vehicle.
FIG. 16b is an enlarged view of the opened port.

FIG. 16 illustrates the location of the charging port 180 adjacent the door 16 on the right side of the vehicle so that the driver is not likely to forget to disconnect the power cable (not shown) from the terminals 182 before entering the vehicle. As seen, the Port 180 has a pivoted cover 184 for the recessed terminals 182.

As will be readily appreciated, the terminals 182 are connected by cable (not shown) to a charger/controller assembly (not shown) located on the rear compartment, and cables (not shown) extend therefrom to the batteries 46 and to the motor 80. The controller desirably incorporates regenerative braking. As will also be appreciated, the circuitry can provide for use with 100–250 V, 50 or 60 Hz. charging current.

The skins are conveniently formed by laying up fiberglass cloth and epoxy or polyester resin on molds or forms, and the thickness of each skin will generally vary from ⅛ inch to 5/16 inch with even thicker sections being employed where it is desired to have extra thickness for strength such as the rib 56 in the upper body 12. Metal plates and rods are embedded in the resin to provide strength and points for attachment of other structures, and the composite increase stiffness. The skins are formed with lips or flanges about their periphery so that the inner and outer skins can be conveniently joined. The skins may also be formed from sheet molding compound and other materials providing suitable strength. After assembly of the skins, polyurethane foam can be injected into the cavity between the skins to provide a wall panel having a thickness of approximately 1–2 inches which is relatively sturdy as well as having excellent insulating characteristics. Alternatively, the foam core can be preformed and the skins assembled thereabout. The molding technique described and illustrated in Applicant's prior U.S. Pat. No. 5,544,937 granted Aug. 13, 1996 for making molded motorcycle seats may be conveniently employed for making the assembly of the body components.

Conveniently, the periphery of the chassis and lower body has an inwardly offset upper edge portion to provide a shoulder against which the upper body may be seated, and the overlapping portions are readily secured in assembly by bolts or the like extending therethrough. In addition, a seal and adhesive bond can be provided between the two overlapping sections by use of a sealant which also has good adhesive characteristics.

As will be appreciated, the upper tub is generally semi-ovoidal in configuration and the chassis 10 provides a generally semi-ovoidal configuration. When assembled, the two body components provide a generally ovoidal configuration for good distribution of impact and a stress loading and a high degree of rigidity. It also offers good aerodynamics properties. Various components can be disposed within the contours such as the sway bar for the front wheel.

As will be readily appreciated from FIGS. 1, 2, 12 and 13, the chassis and body of the vehicle may be readily molded as large sections which can be readily assembled to provide a lightweight and rugged enclosure for the operation. The lower tub 2 provides the chassis 10 and mounts all of the principal operating components of the drive assembly.

By locating the forward bank of batteries forwardly of the front wheel axes and the drive assembly low on the chassis, the center of gravity is located at about 30–38 percent of the distance from the front wheel axis to the rear wheel axis, and approximately in the horizontal plane defined by the wheel axes. This provides a high degree of stability and good cornering characteristics.

The limited use of metallic reinforcing elements significantly enhances the strength of the molded chassis and provides means for securing operating components in a long lived assembly. The metallic elements and molded resin chassis work together for enhanced strength.

As an alternative to the belt and pulley drive in the illustrated embodiment, a chain and sprocket arrangement may also be employed. By designing the vehicle of the present invention as three-wheeled, extra structure to resist the torsional forces is eliminated to reduce weight. Moreover, by locating essentially all structural elements other than the wheels, to be within the envelope of the chassis, the aerodynamics of air flow below the chassis are greatly improved to reduce the energy requirements.

A prototype vehicle constructed in accordance with the attached drawings has a narrow four foot width allowing it to be parked in slots for motorcycles. The location of the center of gravity is approximately one-third of the distance from the two wheel axis to the rear wheel axis. It is also on, or closely adjacent the longitudinal centerline of the vehicle. Its height above ground level is approximately 12 inches ±10%. This is accomplished by locating the batteries, which represent approximately one-half of the weight of the unoccupied vehicle, substantially within the triangle defined by a line extending across the front edge of the two front wheels and lines extending therefrom to the center of the rear wheel. This results in a roll center which is located below ground level to provide extremely high stability.

By securing the front suspension members on the front surface of the battery box or forward bulkhead, the batteries can be mounted as low as possible in the vehicle chassis to keep the center of gravity low and they can be readily replaced or serviced without removing parts of the suspension.

The unequal length dual A-arm front suspension illustrated in the drawings allows the geometry of the suspension to be tuned precisely to maximize stability in handling in the space saving package.

Accordingly, the battery-powered vehicle of the present invention combines low cost of fabrication, low cost of operation, high stability and good protection for the occupant of the vehicle.

Thus, it can be seen from the foregoing detailed description and attached drawings that the battery-powered vehicle of the present invention provides an extended range between battery charges while avoiding the cost, complexity and technological uncertainty of exotic battery systems. The vehicle is compact and relatively inexpensive to fabricate, yet agile and safe.

Having thus described the invention, what is claimed is:

1. An electrically powered vehicle comprising:
   a. a chassis having front and rear ends;
   b. a rigid arm having one end pivotally mounted for pivoting about a first horizontal axis on an axle pivotably supported on said chassis;
   c. at least one wheel rotatably supported on the other end of said rigid arm for rotation about a second horizontal axis;
   d. an electric motor having a drive shaft coaxial with said first axis and comprising a portion of said axle; and
   e. power transmission means for transmitting power from said motor to said one wheel to effect rotation thereof.

2. The vehicle of claim 1 wherein said axle is pivotally supported on said chassis.

3. The vehicle of claim 2 wherein said axle for pivotably mounting said arm extends transversely of said chassis.

4. The vehicle of claim 3 wherein said shaft has a drive pulley thereon disposed within a housing comprising a portion of said axle.

5. The vehicle of claim 4 wherein said power transmission means comprises a flexible endless drive member extending about said drive pulley and a pulley drivingly engaged with said one wheel.

6. The vehicle of claim 5 wherein said housing has at least one aperture through which said drive member extends.

7. The vehicle of claim 3 wherein said chassis has side walls and there are mounted on said side walls brackets with stub shafts which rotatably support said transversely extending axle.

8. The vehicle of claim 1 wherein there is included a pair of wheels rotatably supported adjacent said front end of said chassis and wherein said rigid arm extends rearwardly from its point of pivotal mounting on said chassis.

9. The vehicle of claim 1 wherein there is included a shock absorber having one end connected to said chassis and its other end connected to said other end of said rigid arm.

10. The vehicle of claim 1 wherein said chassis comprises a generally ovoidal tub of synthetic resin having a bottom wall, front and rear walls, side walls, and forward and rearward transversely extending bulkheads spaced from said front and rear walls, said tub being formed as a monolithic structure.

11. The vehicle of claim 10 wherein said chassis includes front and rear wheel mount assemblies each comprising metal mounting members at least partially embedded within said side walls of said tub and a plurality of transversely extending metal rods connecting said mounting members and rigidifying said chassis.

12. The vehicle of claim 11 wherein said axle is pivotably supported on said rear wheel mount assembly.

13. The vehicle of claim 12 wherein there is included a driver's seat removably supported on said rearward bulkhead and rear walls and extending over said compartment and said batteries to provide a cover therefor.

14. The vehicle of claim 10 wherein there are included electric storage batteries disposed in a compartment between said front wall and said forward bulkhead and in a compartment between said rearward bulkhead and said rear wall.

15. The vehicle of claim 1 wherein said chassis comprises a tub having a bottom wall, front and rear walls, and side walls, and wherein there is included an upper tub of synthetic resin extending over said chassis and defining therebetween a passenger compartment.

16. The vehicle of claim 15 wherein said chassis and upper tub provide a generally ovoidal configuration.

17. The vehicle of claim 15 wherein said chassis and upper tub are formed from fiber reinforced synthetic resin.

18. The vehicle of claim 17 wherein said chassis and upper tub are comprised of inner and outer skins and a synthetic resin foam between said skins.

19. The vehicle of claim 15 wherein said upper tub and chassis have overlapping portions, and wherein fasteners secure said overlapping portions in assembly.

20. The vehicle of claim 19 wherein said overlapping portions are also adhesively bonded.

21. The vehicle of claim 15 wherein metal plates are provided in said side walls of said chassis adjacent the said front and rear end walls and metal bars extend transversely between said metal plates.

22. The vehicle of claim 15 wherein there are included front and rear body sections secured to said chassis and upper tub.

23. The vehicle of claim 15 wherein there is included a molded dashboard secured to said upper tub and extending transversely thereof and a steering column having its upper end supported in said dashboard.

24. The vehicle of claim 1 wherein only one wheel is carried on said rigid arm to provide a three-wheeled vehicle.

25. In a powered land vehicle, the combination comprising:
   a. a chassis having front and rear ends and comprising:
      (i) a lower tub formed of synthetic resin with a bottom wall, front and rear walls and side walls; and
      (ii) front and rear wheel mounting assemblies each comprising metal mounting members at least partially embedded within said side walls of said lower tub and a plurality of transversely extending metal rods connecting said mounting members;
   b. an upper tub formed of synthetic resin extending over said chassis and defining therebetween a passenger compartment; and
   c. a drive assembly for powering said vehicle.

26. The vehicle of claim 25 wherein said chassis and upper tub provide a generally spheroidal configuration.

27. The vehicle of claim 25 wherein said tub and upper tub are formed from fiber reinforced synthetic resin and have overlapping portions, and wherein fasteners secure said overlapping portions.

28. The vehicle of claim 27 wherein said overlapping portions are also adhesively bonded.

29. The vehicle of claim 25 wherein said lower tub and upper tub are comprised of inner and outer skins and a synthetic resin foam between said skins.

30. The vehicle of claim 25 wherein metal plates are provided in said side walls of said chassis adjacent said front and rear end walls and metal bars extend transversely between said metal plates.

31. The vehicle of claim 25 wherein there is included a molded dashboard secured to said upper tub and extending transversely thereof and a steering column having its upper end supported in said dashboard.

32. The vehicle of claim 25 wherein said chassis includes integrally formed forward and rearward bulkheads extending transversely between said sidewalls adjacent said front and rear walls and defining therewith front and rear compartments and wherein said drive assembly includes a multiplicity of batteries in each compartment.

33. The vehicle of claim 32 wherein said vehicle includes a driver's seat removably supported on said rearward bulkhead and extending over said compartment to provide a cover for said batteries.

34. The vehicle of claim 25 wherein said vehicle includes a pair of front wheels, a single rear wheel and drive means for driving said rear wheel.

35. The vehicle of claim 34 wherein said rear wheel is mounted on one end of a swing arm and the other end of said swing arm is pivotally mounted on said chassis for pivoting about a horizontal axis.

36. The vehicle of claim 25 wherein there are included front and rear body sections of synthetic resin secured to said lower and upper tubs.

* * * * *